US006682144B2

(12) United States Patent
Klingler (10) Patent No.: US 6,682,144 B2
(45) Date of Patent: Jan. 27, 2004

(54) SUPPORT WITH ADJUSTABLE ARCH, ESPECIALLY A LUMBAR SUPPORT FOR ANY TYPE OF SEAT OR BED (75) Inventor: Knud Klingler, Linz (AT)

(73) Assignee: Schukra Gerätebau AG, Berndorf (AT)

( * ) Notice: Subject to any disclaimer, the term of this patent is extended or adjusted under 35 U.S.C. 154(b) by 0 days.

(21) Appl. No.: 09/729,538

(22) Filed: Dec. 4, 2000

(65) Prior Publication Data
US 2003/0006635 A1 Jan. 9, 2003

(51) Int. Cl.[7] ................................................. A47C 7/46
(52) U.S. Cl. .................... 297/284.4; 297/284.7
(58) Field of Search ................. 297/284.4, 284.7; 267/158

(56) References Cited

U.S. PATENT DOCUMENTS

| 5,197,780 A | * | 3/1993 | Coughlin | 297/284.7 |
| 5,217,278 A | * | 6/1993 | Harrison et al. | 297/284.7 |
| 5,462,335 A |   | 10/1995 | Seyler | |
| 5,505,520 A | * | 4/1996 | Frusti et al. | 297/284.4 |
| 5,518,294 A | * | 5/1996 | Ligon, Sr. et al. | 297/284.4 |
| 5,567,010 A | * | 10/1996 | Sparks | 297/284.4 |
| 5,651,583 A |   | 7/1997 | Klingler et al. | |
| 5,913,569 A |   | 6/1999 | Klingler | |
| 5,934,752 A |   | 8/1999 | Klingler | |
| 6,139,102 A | * | 10/2000 | von Möller | 297/284.4 |

FOREIGN PATENT DOCUMENTS

| DE | 42 32 679 C1 | 2/1994 |
| DE | 43 20 105 C1 | 10/1994 |
| DE | 44 44 803 C2 | 4/1997 |

* cited by examiner

Primary Examiner—Peter M. Cuomo
Assistant Examiner—Joseph Edell
(74) Attorney, Agent, or Firm—Grant D. Kang; Robert C. Haldiman; Husch & Eppenberger LLC (57) ABSTRACT The invention relates to a support with adjustable arch, especially a lumbar support for seats, in particular motor vehicle seats and chair back rests as well as for any type of bed, the structure of which comprises an arching element and an adjustment device for setting and readjusting the arching of the arching element.

11 Claims, 7 Drawing Sheets

SUPPORT WITH ADJUSTABLE ARCH, ESPECIALLY A LUMBAR SUPPORT FOR ANY TYPE OF SEAT OR BED

The invention relates to a support with adjustable arch, especially a lumbar support for seats, in particular motor vehicle seats and chair back rests as well as for any type of bed, the structure of which comprises an arching element and an adjustment device for setting and readjusting the arching of the arching element.

Arching elements are known e.g. from DE-OS 25 41 559, DE 42 32 679 C1 and DE 44 44 803 C2. Virtually all known arching elements have in common that the stiffness of the arching element increases as the arching increases and the surface area by which it bears against the body to be supported, is progressively decreased until a linear line of contact is attained, which, at least after prolonged use, results in discomfort to the user and even pain. These problems accumulate if, in addition, the level of the arching element is wrongly adjusted.

From DE-OS 25 41 559 a back rest is known, which provides an extendible and retractable rigid support panel fitted to two supports in the form of leave springs, which are movable in relation to one another and together. In this case, the support surface is of constant size regardless of its extended or retracted state and is also, in principle, of constant rigidity.

From U.S. Pat. No. 5,651,587, forming the generic clause of claim 1 and from corresponding DE 42 32 679 C1, but also from DE 43 20 105 C1 back rests are known having an adjustable arching element, and which comprise an additional pelvic support, connected to the arching element. In this manner an improved large area support, in particular in the direction of the pelvis is attained, even if arching is extensive, in particular, if according to a working example a resiliently flexible panel is provided instead of a rigid one, but which is then spring-loaded on one side. However, this embodiment is complicated to manufacture and due to the large number of components required, is also expensive.

From DE 44 44 803 C3 a resilient arching element of plastics is known, manufactured in one piece and therefore simple to manufacture, into which parts of the adjustment device have been integrated resulting in the aforementioned problems in the event of pronounced arching.

It is an object of the invention to develop a support, arching of which is adjustable according to the generic clause of claim 1, in such a manner that a resilient and large area contact with the user is provided, even in the event of extreme arching, where this support should, in addition, be easily and rapidly manufactured and assembled in a cost-effective manner.

This object is attained in a support with adjustable arch having the characterising integers of claim 1. By this solution an arching element is attained from an archable element member and a panel, in which case the panel connected thereto, due to its low surface area connection, is subjected to little or no arching and, regardless of the degree of arching, always acts in a resilient and thereby large area manner.

The subsidiary claims embrace advantageous further developments of the subject of claim 1, the respective advantages of which are further explained in the description of working examples of the invention.

In the following, the invention will be further elucidated by way of working examples with reference to the drawings. There is shown in.

Figure 1:
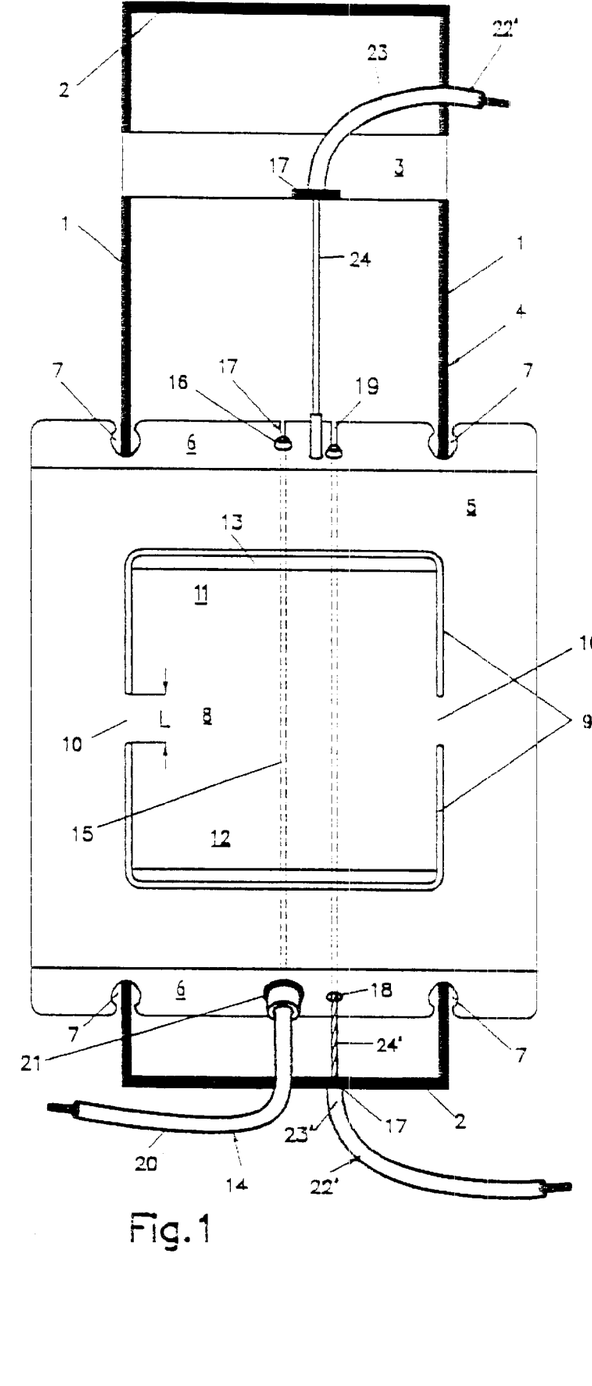
FIG. 1 a plan view of an arching adjustable support with a panel, accommodated in an up and down movable manner in the back rest of a seat.
Figure 2:
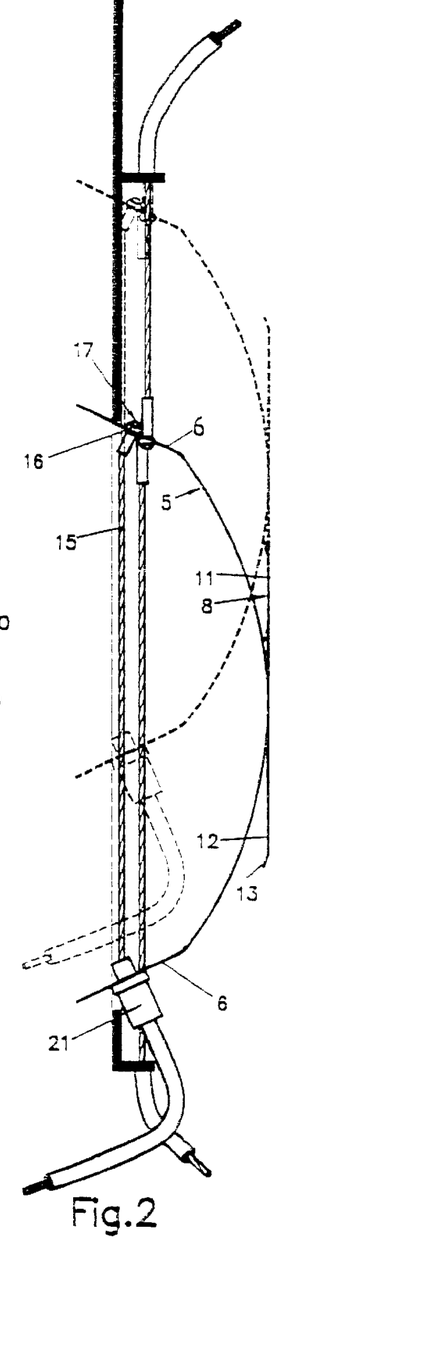
FIG. 2 a side elevation of what is shown in FIG. 1.

In FIGS. 1 and 2 a support with adjustable arch is illustrated, which is fitted adjustably on longitudinal rods 1 in the form of round rods. The longitudinal rods 1 are connected at the upper and lower ends to transverse rods 2 and therebetween to an intermediate rod 3. The structure 4 formed by the rods 1, 2, 3 forms part of a back rest of an optional kind of seat which is not illustrated. Preferably, the structure 4 is connected to the back rest by means of fastener elements of plastics. The support comprises an archable element member 5, fitted up and down movably along the longitudinal rods 1. It is of sheet-like configuration and comprises at its upper and lower ends bent over edges 6, in which slotted guide apertures 7 are formed, provided for the movable fitting of the archable element member 5 to the structure 4 without use of tools.

A panel 8 is centrally fitted in the archable element member 5 having been blanked out of the archable element member 5 by blanking of two U-shaped slots 9, leaving behind two symmetrically arranged connecting webs 10 therebetween. The connecting webs 10 form for the panel 8 a kind of pivoting axis, arranged parallel to the edges 6 of the archable element member 5. In the working example according to FIG. 1 the connecting webs 10 are fitted symmetrically in relation to the panel 8, i.e. the panel 8 is subdivided into two equal partial panels 11, 12—an upper one 11 and a lower one 12—. Each partial panel 11, 12 at each of its respective free ends comprises a rearwardly folded over or bent over rim 13.

The archable member 5 is provided with parts of an adjustment means for the setting and readjusting of its arching, which in this embodiment includes a Bowden cable arrangement 14. The Bowden cable arrangement 14 comprises a cable 15, fixed by means of its end comprising a nipple 16 in a rebate 17, formed in one of the edges 6 of the archable element member 5. In this embodiment the rebate 17 in the upper edge 6 is provided in the form of a rebate 18 for holding the nipple 16 and with a slot 19 for introducing the cable 15. At the opposite lower edge 6, a rebate 17 is provided for holding one end of the sleeve 20 surrounding the cable 15 of the Bowden cable structure 14 in the form of a sleeve 21.

For adjusting the arching element member 5 over a distance, in this case for adjusting the level between the lower transverse rod 2 and the intermediate rod 3, there is provided in this embodiment an apparatus having two Bowden cables 22, 22', the sleeves of which 23, 23' are accommodated in rebates 17 on the intermediate rod 3, respectively in the lower transverse rod 2. The respective cables 24 and 24' respectively are fitted in the archable element member 5. In the embodiment their ends have been strung into the upper edge 6 of the archable element member 5. By this adjoining arrangement of the cable ends, any level adjustment has no effect on the respectively set-up arching. This would only happen if one of the cable ends were fitted to the upper and the other one to the lower edge 6. In the present case, the level adjustment proceeds in that a force is applied either to the upper or to the lower cable, the other one being simultaneously relaxed to the same degree. Optional alternative adjustment means may be employed, e.g. a rack and pinion drive or using a single Bowden cable operating in counter action with springs or any other optional adjustment mechanisms.

In FIG. 2 a relatively strongly arched element member 5 with its bent over edges 6 is shown in solid lines close to its lower terminal position and in broken lines in its upper terminal position. Because the panel 8 is connected to the archable element member 5 solely along the length L of the connecting rods 10, it is hardly subjected to any arching so that (cf. FIG. 2), it projects virtually vertically, in which context its upper as well as its lower panel portions 11, 12 act in a resiliently yielding manner.

Figure 3:
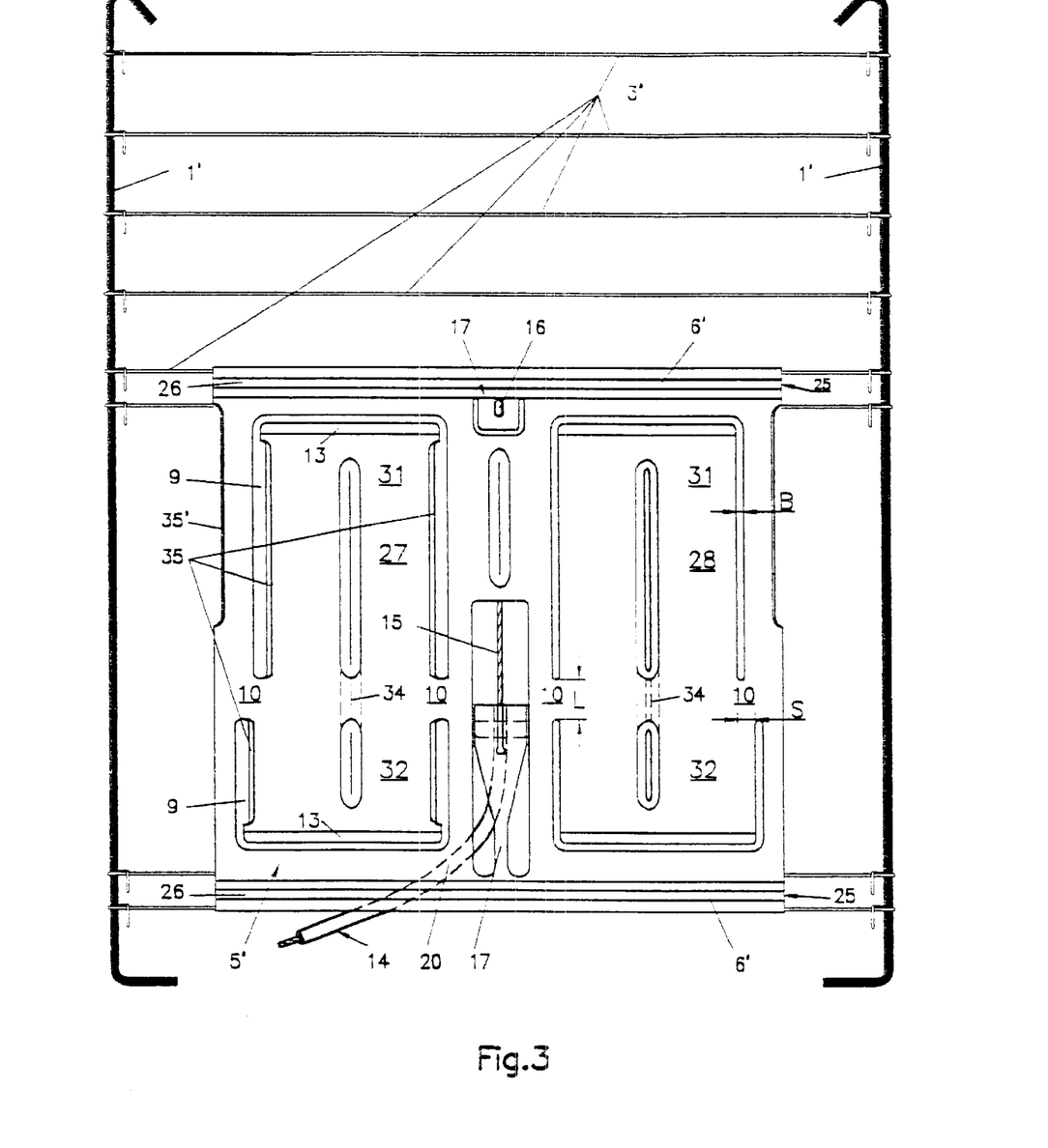
FIG. 3 a working example of a support with two panels arranged side-by-side.

The embodiment illustrated in FIG. 3 of a support the arching of which is adjustable, comprises two longitudinal rods 1', which are preferably fitted in a known manner in the back rest of a seat (not illustrated), using fastening elements of plastics. Between the longitudinal rods 1 parallel intermediate rods 3' of wire are strung. The archable element member 5' in its upper and lower region comprises hook-shaped bends 25 or bent over or folded over regions which extend rearwardly and each serve for the accommodation of an intermediate rod 3', i.e. for fixing the archable element member 5' to the structure 4' formed by the longitudinal rods 1 and intermediate rods 3', for which purpose the intermediate rods 3' are inserted behind the bent over portions 25. If arching of the archable element member 5' is increased, this also results in a minor tensioning of the transverse rods 3', into which the archable element member 5' has been hung. For transverse rigidising of the edges 6, 6', continuous transverse corrugations 26 may be provided. In the archable element member 5' two panels 27, 28, arranged symmetrically to one another, are so arranged in relation to one another that a central space 29 remains therebetween. In the gap 29 in the region of the upper and the lower edges 6, 6' each, a rebate 17 is provided serving for affixing the one end of the cable 15 or the one end of the sleeve 20 of a Bowden cable structure 14 for adjusting the arching of the archable element member 5'. The upper rebate 17 takes the form of an eyelet serving for passing therethrough and holding the nipple 17 of the cable 15. The rebate 17 for holding the end of the sleeve 20 of the Bowden cable structure 14 is illustrated in more detail in FIG. 8 and will be described further below.

The panels 27, 28 in this embodiment according to FIG. 3 are of asymmetric design, on the one hand in that their upper panel portions 31 are longer than the lower panel portions 32, and on the other hand in that the lower panel portions 32 as compared with the upper panel portions 31 are also of greater width. The panels 27, 28 moreover comprise rearwardly edge-folded or bent-over rims 13 above and below. The illustrated panels 27, 28 comprise strengthening and/or weakening formations for increasing the flexibility in an optional desired arrangement which may be provided in the form of beads or ribs or slots comprising or not comprising bent over edges for increasing the rigidity. In the embodiment shown examples of reinforcements or weakenings in the archable element member 5' and in the panels 27, 28 are provided in linear fashion, but other configurations e.g. wedge-shaped, are also possible. In this manner the resilient bending properties of the archable element member 5' as well as of the panels 27, 28 may be designed in optional fashion.

The panels 27, 28 are separated by slots 9 leaving connecting webs 10 in accordance with the embodiment described in FIGS. 1 and 2, separate from the archable element member 5' or connected thereto along a linear axis The reinforcements or weakenings in the panels 27, 28 may be provided continuously in the axes of the connecting webs 10 or may be interrupted, in which case there remain flat or profiled intermediate webs 34. It is also possible to increase the rigidity of the panels 27, 28 by stiffening their longitudinal edges 35 next to the slots 9 separating these by bending over, beading or the like. Corresponding possibilities arise for the archable element member 5', where along the outer longitudinal margins 35' bent around flanges or beadings are provided and in the central portion 29 ribs or beads. It will be understood that by the manner and particular local arrangement of the reinforcing or weakening formations the arching properties of the archable element member 5' as well as the resilient properties of the upper and lower panel portions 31, 32 can be influenced in any desired manner. This applies in the same manner also to the respective magnitudes of the upper and lower panel portions 31, 32 as well as to the width B of the slots 9 as well as in respect of the length L and magnitude S of the connecting webs 10 and 34.

Figure 4:
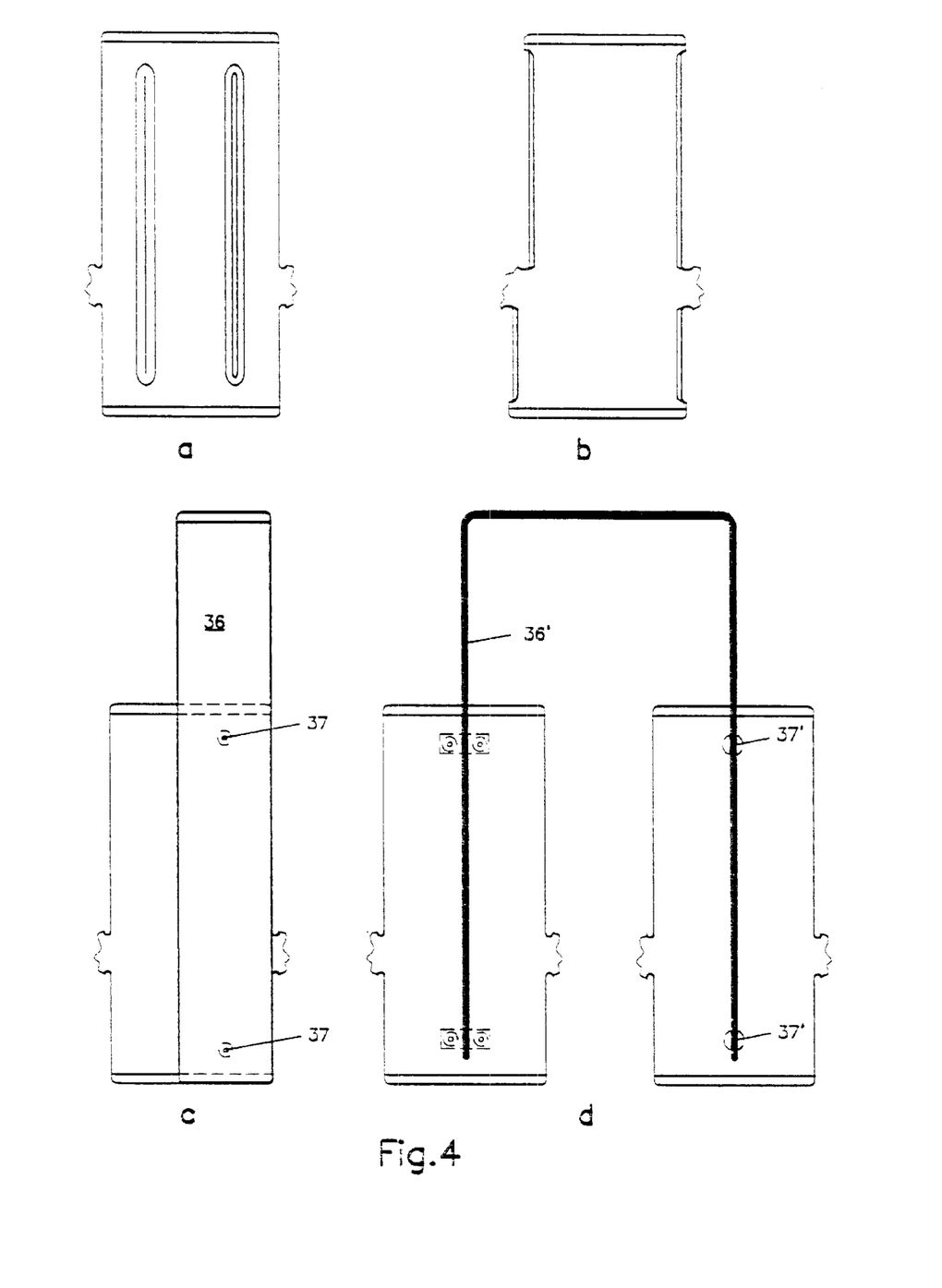
FIG. 4 a variety of embodiments of panels.

FIG. 4 shows a small selection of various configurations and designs of panels 8, 27, 28. In FIG. 4a an embodiment of a panel is shown comprising a beading and a rib with a slot-shaped aperture. FIG. 4b shows a panel which is flat with the exception of the bent over portions 13. In FIG. 4c a panel is shown with a longitudinal extension 36, which may be connected, for example, by riveting 37 or adhesive bonding firmly to the respective panel. In the embodiment illustrated in FIG. 4d two panels are longitudinally extended by a stirrup piece 36' as well as being connected to one another thereby. Each extension may be bent from wire-shaped material and be inserted in or affixed to holding means 37', provided in the panels, e.g. in the form of e.g. blanked out insertion holes or by means of separate fasteners.

Figure 5:
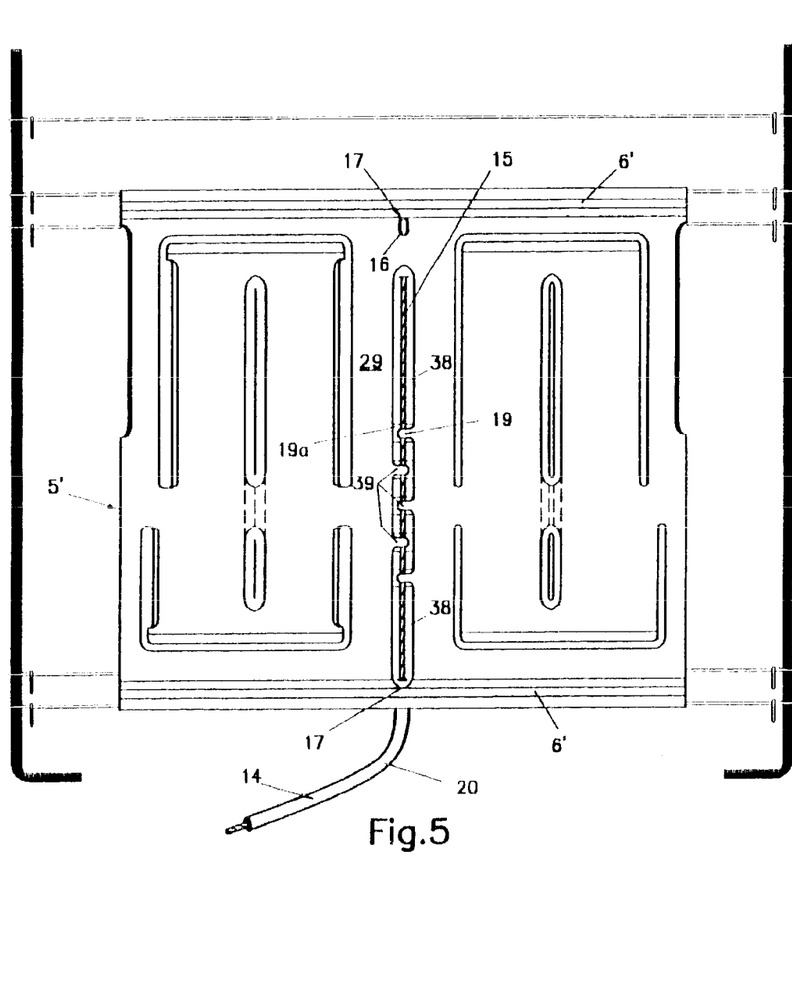
FIG. 5 a plan view of a working example, comprising two panels and a central passage for the cable of a Bowden cable arrangement for adjusting the arching.
Figure 6:
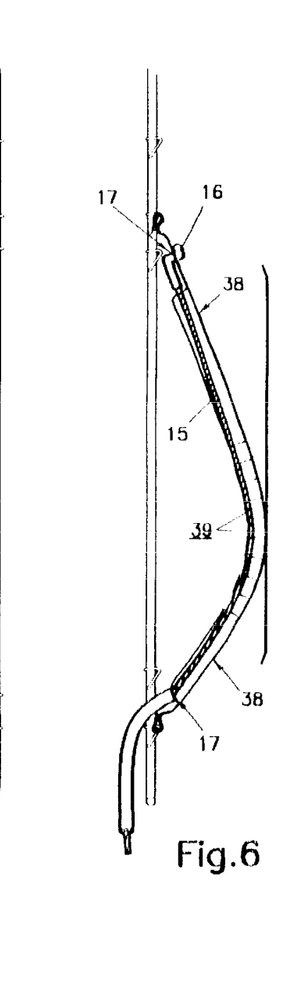
FIG. 6 a side elevation of what is shown in FIG. 5.

The embodiment illustrated in FIG. 5 and FIG. 6 is similar to the embodiment described with reference to FIG. 3, but with the central intermediate region 29 being of different design. Centrally, in the intermediate region 29, a groove 38 is provided, serving for an accommodation and as a passage for the cable 15 of a Bowden cable arrangement 14 for adjusting the arching of the arching panel 5', of which the nipple 16 fitted to the end of the cable 15 is hung into a rebate 17 at the upper edge 6 of the archable element member 5'. The groove 38, particularly in the region of the crown of the arching is designed discontinuously and open to the outside, more particularly, in order not to interfere with the flexibility of the arching in this region. In this central region, serving as a longitudinal extension of the continuous parts of the groove 38, projections 39 are provided, preferably alternatingly from both sides, which can be so bent over as to serve as a lower and upper guide for the cable 15. At the lower edge 6' a rebate 17 for accommodating the end of the sleeve of the Bowden cable arrangement 14 is provided at the end of the groove 38. It may take the form of a bore passing right through at the end of the groove 38, allowing the passage of the nipple 16 and of the cable 15, but retaining the sleeve 20 against slipping through. In a similar manner a passage for the nipple 16 and the cable 15 is provided at the upper end of the groove 38.

Figure 7:
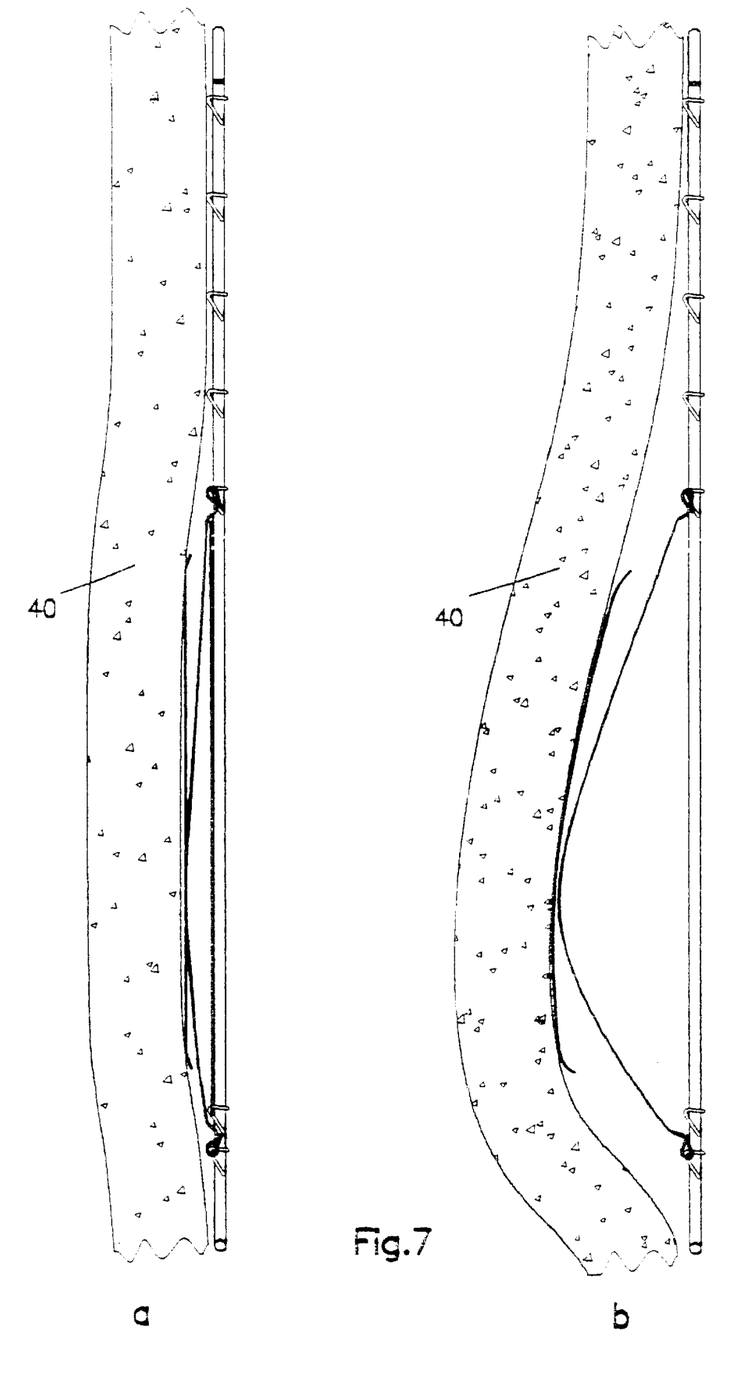
FIG. 7 a support fitted with a cover a) in its starting position and b) when strongly arched.

In FIG. 7 the mode of function of the described supports is illustrated diagrammatically, the support being shown in FIG. 7a in a starting position without arching and in FIG. 7b with maximum arching, the support being provided with a cover 40, which more particularly may be upholstery. From FIG. 7a the large surface area contact of the cover 40 against the entire support is apparent in the starting position. However, even at maximum arching a large surface area and elastically yielding support is supplied by the panel(s) to the cover 40, resulting in a clearly improved seating comfort being attained as compared with the aforedescribed state of the art, where merely the rigid unyielding arch would be effective and that, moreover, only in a linear fashion.

Figure 8:
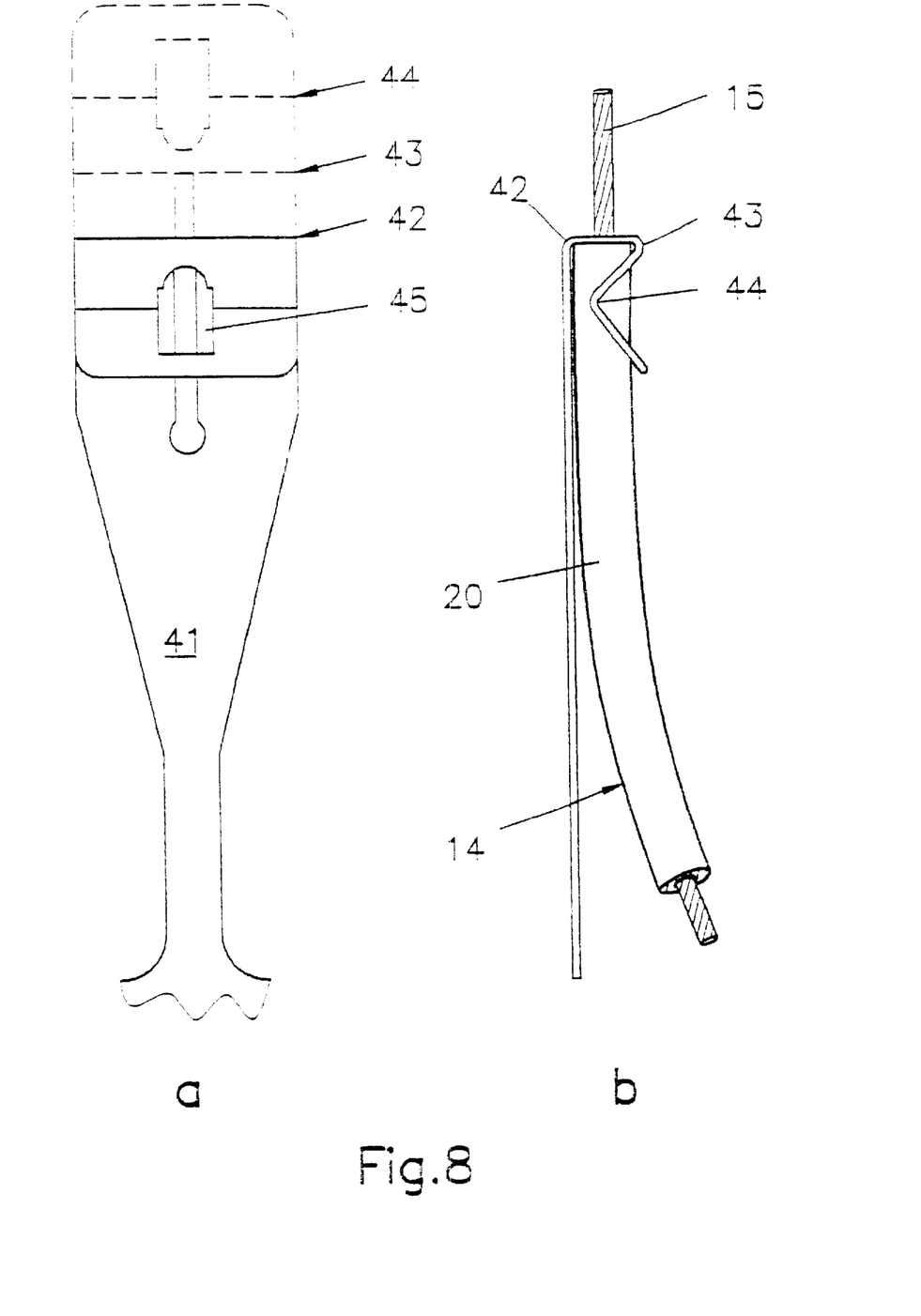
FIG. 8 a side elevation of a passage in the form of a blanked out web for the end of the sleeve of a Bowden cable as a blanked component and after deformation with the sleeve fitted thereto.

FIG. 8 shows the rebate 17 for the sleeve 20 of a Bowden cable arrangement 14, already mentioned in conjunction with the embodiment according to FIG. 3. The illustrated solution is in the form of a web 41, connected at the lower end to the archable element member 5' and the free end of which is bent over approximately at right angles along a first folding or bending line 42 and is folded over along a second line 43 by an angle exceeding 90° and along a third line 44 is bent back by about 90° in such a manner that a kind of spring clamp is formed (see FIG. 8b). The clamp on the one hand comprises in the region between the lines 42 and 43 a passage for the cable 15, optionally also for the nipple (not illustrated), fitted to its end, as well as a further aperture 45 so designed that, when the sleeve 20 is inserted and bears in contact against the web 41 it is held laterally as well as from above (see FIG. 8b).

Figure 9:
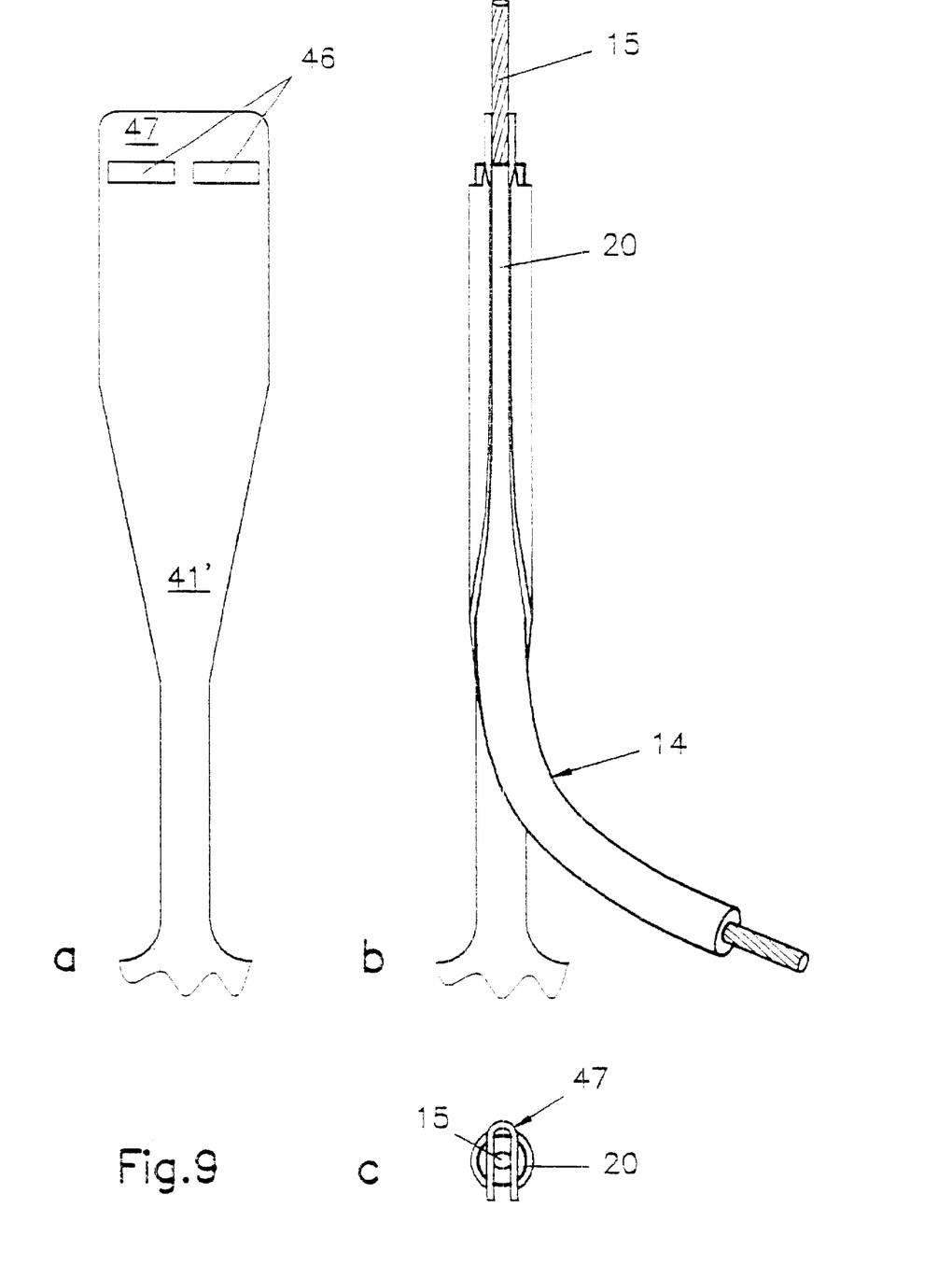
FIG. 9 a side elevation and a plan view of a working modification of a passage means, a) in the form of a blanked out web and b) after deformation with the sleeve attached thereto.

In FIG. 9a modification of a web 41' is shown for accommodating the end of a sleeve 20 of a Bowden cable arrangement 14. For this purpose the web 41' at its free end comprises two slots 46 provided at a common level. In order to anchor the sleeve 20, the latter is longitudinally arranged on the web 41' in such a manner that the end of the sleeve 20 lies in the region of the slots 46, the web 41' being bent around the sleeve 20 such that it embraces the latter by more than 180°, i.e. in a clamping fashion. Thereafter the edge 47 of the web 41' remaining above the slots 46 is compressed as shown in FIG. 9c, in a U-shaped manner such that the U-edges cover the sleeve end and take care of its fixed positioning without interfering with the free movability of the cable 15.

The illustrated embodiments offer the particular advantage that they can be stamped from a sheet-like resilient material in a single process step. Particularly advantageous is the use of sheet metal, particularly if further blanked formations and deformations in the form of ribs, bends, beads and the like are provided, in particular a steel sheet, because such further blanking or deforming, e.g. for the rebates 17 may be integrated with the stamping procedure such that only a single processing step is needed. However, there is also the possibility to manufacture such supports in one piece from plastics, e.g. in a pressing procedure including providing regions of greater and/or lesser thickness or to stamp these from plastics sheet material, where it is optionally possible to provide necessary thicker or thinner regions in a second processing step. All procedures can be automatised and thus performed in a cost-effective manner. When using sheet material, e.g. sheet metal, the thickness of the material may be selected in accordance with the desired properties, such that, where appropriate, reinforcing formations may be dispensed with entirely. Further possibilities for influencing the characteristics of the supports, in particular also the resilient panels, are mentioned further above.

What is claimed is:

1. A lumbar support mechanism comprising:

a frame member being flexiable through a range of flexion, said frame member having a variable resilience, said variable resilience varying through said range of flexion such that increased flexion stiffens said variable resilience of said frame member, said frame member being adapted to be supported at an upper portion and a lower portion;

an adjustment device operatively engaged with said upper portion and said lower portion of said frame member such that adjustment of said adjustment device varies said flexion; and two partial panels, said partial panels being disposed in opposite directions; said partial panels being integral with and circumscribed by said frame member, said partial panels being further defined by two U-shaped slots in said frame member, said partial panels having a panel resilience, wherein said panel resilience remains substantially unchanged through said range of flexion of said frame member.

2. The lumbar support mechanism according to claim 1, wherein said partial panels and said frame members are sheet metal.

3. The lumbar support mechanism according to claim 1 wherein said partial panels include at least one bent edge.

4. The lumbar support mechanism according to claim 1, wherein said frame member further comprises a plurality of stiffening formations selected from the group consisting of ribs, beads, and bent over portions.

5. The lumbar support mechanism of claim 1 wherein said adjustment device is a traction cable assembly.

6. The lumbar support mechanism of claim 5 in which said frame member further comprises:

a first rebate operatively engaged with one end of a cable of said traction cable assembly and a second rebate operatively engaged with one end of a sleeve of said traction cable assembly.

7. The lumbar support mechanism according to claim 6, wherein said first and second rebates are integrally formed with said frame member.

8. The lumbar support mechanism according to claim 6, wherein said frame member further comprises:

a groove corresponding to a path for operation of said traction cable assembly.

9. The lumbar support mechanism according to claim 1, further comprising:

a plurality of plastic fastening elements for affixing said frame member to a mounting structure adapted to mount in a seat frame.

10. The lumbar support mechanism according to claim 1, wherein said panels are asymmetric.

11. The lumbar support mechanism according to claim 1, wherein said slots are asymmetric.

* * * * *